United States Patent
Zheng

(10) Patent No.: US 9,854,320 B2
(45) Date of Patent: Dec. 26, 2017

(54) METHOD AND SYSTEM FOR ACCESSING TV PROGRAMS AND APPLICATIONS ON SMART TV

(71) Applicant: HUIZHOU TCL MOBILE COMMUNICATION CO., LTD., Huizhou (CN)

(72) Inventor: Yu Zheng, Huizhou (CN)

(73) Assignee: HUIZHOU TCL MOBILE COMMUNICATION CO., LTD., Hui Zhou (CN)

( * ) Notice: Subject to any disclaimer, the term of this patent is extended or adjusted under 35 U.S.C. 154(b) by 0 days.

(21) Appl. No.: 14/770,343

(22) PCT Filed: Jun. 4, 2014

(86) PCT No.: PCT/CN2014/079128
§ 371 (c)(1),
(2) Date: Aug. 25, 2015

(87) PCT Pub. No.: WO2015/135260
PCT Pub. Date: Sep. 17, 2015

(65) Prior Publication Data
US 2016/0323648 A1    Nov. 3, 2016

(30) Foreign Application Priority Data
Mar. 11, 2014    (CN) .......................... 2014 1 0087163

(51) Int. Cl.
*H04N 21/482*    (2011.01)
*H04N 21/472*    (2011.01)
(Continued)

(52) U.S. Cl.
CPC ....... *H04N 21/4821* (2013.01); *H04N 21/472* (2013.01); *H04N 21/64322* (2013.01); *H04N 21/84* (2013.01); *H04N 21/8545* (2013.01)

(58) Field of Classification Search
CPC ............ H04N 21/4831; H04N 21/472; H04N 21/64322; H04N 21/84; H04N 21/8545
See application file for complete search history.

(56) References Cited

U.S. PATENT DOCUMENTS

| 8,316,088 B2 * | 11/2012 | Jalava ................... G06Q 10/10 370/255 |
| 2004/0013409 A1 * | 1/2004 | Beach ................... H04N 5/782 386/260 |

(Continued)

FOREIGN PATENT DOCUMENTS

| CN | 1960413 A | 5/2007 |
| CN | 101141607 A | 3/2008 |

(Continued)

OTHER PUBLICATIONS

Search Report from CN Application No. 2014100871638 dated Oct. 25, 2016.

*Primary Examiner* — Pinkal R Chokshi
(74) *Attorney, Agent, or Firm* — Shimokaji IP

(57) ABSTRACT

A method for accessing TV programs and applications on a smart TV may include receiving a channel selection command from a user, and determining an index number corresponding to the channel selected by the user according to the command. The method may also include searching for a program resource or an application corresponding to the determined index number through a preset index table, and starting and displaying the identified program resource or application. A system for accessing TV programs and applications on a smart TV may change a channel management mode of conventional systems of smart TVs and set-top boxes, such that information of TV programs and applications can be displayed together and called conveniently. A user can conveniently and rapidly switch between programs (Continued)

and applications without the need to switch between TV channel and application interfaces.

12 Claims, 1 Drawing Sheet

(51) Int. Cl.
*H04N 21/643* (2011.01)
*H04N 21/84* (2011.01)
*H04N 21/8545* (2011.01)

(56) References Cited

U.S. PATENT DOCUMENTS

| | | | | |
|---|---|---|---|---|
| 2010/0082774 | A1* | 4/2010 | Pitts | G06F 17/30144 709/219 |
| 2013/0293786 | A1* | 11/2013 | Li | H04N 21/472 348/731 |
| 2014/0053207 | A1* | 2/2014 | Shoykher | H04N 5/44 725/50 |
| 2014/0351322 | A1* | 11/2014 | Mun | H04L 67/10 709/203 |
| 2015/0189368 | A1* | 7/2015 | Lee | H04N 21/4223 725/37 |
| 2015/0256893 | A1* | 9/2015 | Jayaram | H04N 21/2408 725/40 |

FOREIGN PATENT DOCUMENTS

| | | |
|---|---|---|
| CN | 101741893 A | 6/2010 |
| CN | 102291615 A | 12/2011 |
| CN | 102685601 A | 9/2012 |

\* cited by examiner

METHOD AND SYSTEM FOR ACCESSING TV PROGRAMS AND APPLICATIONS ON SMART TV

TECHNICAL FIELD

The present disclosure relates to the field of smart TV. In particular, the present disclosure relates to a method and a system for accessing TV programs and applications on a smart TV.

BACKGROUND

As relevant technologies grow increasingly mature, smart TVs have become more and more popular. There are more and more associated products capable of achieving smart TV functions, such as set-top boxes, multimedia boxes and family gateways. As a result, it is very easy to change a regular TV to a smart TV or similar device.

In addition, cloud computing is gradually becoming a part of people's family lives. Big data and data mining have made it possible for TVs to provide content, such as personalized videos and games, and individual customization has become a tendency of the development of mobile internet content services.

Currently, smart TVs typically comprise two parts: the above conventional TV programs, and applications. The conventional TV programs and the applications usually require employment of two different management systems, to manage TV programs and to manage applications, respectively, leading to issues for users. For example, when a user needs to change from a TV program to an application, she needs to first change to the application interface, and then look for the desired application, making it very inconvenient. Moreover, the above complex operations are not suitable for elderly people or children.

Therefore, the prior art is in need of improvement and development.

SUMMARY

In light of the above drawbacks of the prior art, the objects of the present invention are to provide a method and a system for accessing TV programs and applications on a smart TV with the intentions to solve the problems of inconvenient operations as a result of existing smart TVs displaying TV programs and applications on separate interfaces.

A method for accessing TV programs and applications on a smart TV includes receiving a channel selection command from a user, and determining an index number corresponding to the channel selection command; searching for a program resource or an application corresponding to the determined index number based on a preset index table to identify a program resource or an application; starting and displaying the identified program resource or the identified application.

In another embodiment, a method for accessing TV programs and applications on a smart TV includes an index table that contains a one-to-one correspondence between an index number and information associated with each program resource and a one-to-one correspondence between an index number and information associated with each application.

In a further embodiment, a method for accessing TV programs and applications on a smart TV includes information associated with program resources that comprises a channel identification, a channel number and channel auxiliary information, wherein the channel identification is label information or a key recognition technical parameter of each program channel by a system, the channel number is an identification information code designated by the system to a program channel, and the channel auxiliary information comprises a channel name, channel description information and channel content prompt information.

In yet another embodiment, a method for accessing TV programs and applications on a smart TV includes information associated with applications that comprises an application name and an application calling parameter.

In yet a further embodiment, a method for accessing TV programs and applications on a smart TV includes presetting an index table.

In another embodiment, a method for accessing TV programs and applications on a smart TV includes presetting an index table by acquiring program resources and associated information, identifying applications installed in a system and associated information, and establishing one-to-one correspondences between associated information of program resources, associated information of applications, and index numbers.

In a further embodiment, a method for accessing TV programs and applications on a smart TV includes associated information of program resources and applications, in a current system, that is acquired regularly, the acquired associated information is compared with corresponding content in an index table, and if the acquired associated information and the corresponding content in the preset index table are inconsistent according to the comparison, the associated information of program resources or applications is updated in the preset index table.

In yet another embodiment, a method for accessing TV programs and applications on a smart TV includes searching for associated information of a program resource corresponding to a determined index number in a preset index table, and positioning to a program channel corresponding to the program resource using the associated information; searching for associated information of an application corresponding to the determined index number based on the preset index table, and positioning to the application using the associated information.

In yet a further embodiment, a system for accessing TV programs and applications on a smart TV includes a command receiving module for receiving a channel selection command from a user; a channel management module for determining an index number corresponding to the channel selection command received by the command receiving module, searching for a program resource or an application corresponding to the determined index number through a preset index table to identify a program resource; and an application management module for starting and displaying the application identified by the channel management module.

In another embodiment, a system for accessing TV programs and applications on a smart TV includes an index table setting module for presetting an index table.

A method and a system for accessing TV programs and applications on a smart TV includes a system that changes a channel management mode of conventional systems of smart TVs and set-top boxes, such that information of TV programs and applications can be displayed together and called conveniently. Thereby, a user can conveniently and rapidly switch between programs and applications without the need to switch between TV channel and application interfaces, which reduces operation complexity, simplifies operations, and facilitates use of an associated smart TV by elderly people and children.

DETAILED DESCRIPTION

A method and a system for accessing TV programs and applications on a smart TV are provided. To make the objects, technical solutions, and effects of the present invention clearer, the present invention is described in detail below with reference to the accompanying figures and exemplary embodiments. It should be understood that the exemplary embodiments are for illustrative purposes only. The exemplary embodiments are not intended to limit the scope of the claimed invention in any way.

Figure 1:
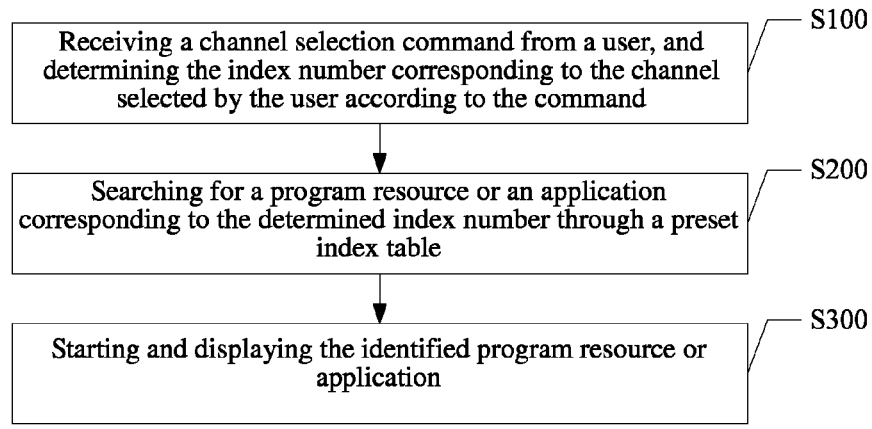
FIG. 1 depicts a flow chart of a method for accessing TV programs and applications on a smart TV in an exemplary embodiment of the present invention.

Turning to FIG. 1, a method for accessing TV programs and applications on a smart TV may include receiving a channel selection command from a user, and determining an index number corresponding to the channel selection command (block S100). As used herein, a channel selection command from a user means a corresponding key value signal received by a system after the user operates a remote control or remote control software. Of course, the user may access a TV program and application by directly inputting a channel number. The term "channel," as used herein, refers to identification information capable of directly accessing corresponding program content or an application function. A correspondence between key values and index numbers may be preset in the system, and when the system receives a channel selection key value, the system may directly determine a corresponding index number according to the correspondence. The method may also include searching for a program resource or an application corresponding to a determined index number based on a preset index table (block S200).

A preset index table may contain a one-to-one correspondence between an index number and information associated with each program resource and a one-to-one correspondence between an index number and information associated with each application. Furthermore, the information associated with program resources may include a channel identification, a channel number and channel auxiliary information, and may further include information of other channels that can be dynamically updated. A channel identification may be label information or a key recognition technical parameter of each program channel by the system (e.g. a radio TV, IP TV and set-top box system). The channel number may be an identification information code designated by the system to a program channel, and the channel auxiliary information may include a channel name, channel description information and channel content prompt information. In addition, the channel auxiliary information may further include other technical information for describing a corresponding TV program channel.

The information associated with applications may include an application name and an application calling parameter. The application name may be application registration information that may be required by the system to execute the application during running, and may include an application calling entry point, a type name, a registered name of the program, and a program file name. The application calling parameter may refer to parameter information for implementing a start or calling of an application. In addition, the information associated with applications may further include parameters, such as program history calling information, a program running state, a program home subscriber, a program multi-access authority or attribute, and program limiting conditions, etc.

Each item in the index table may include at least one index number, and the associated information having correspondence with the index number, the associated information may be either information associated with a program resource or information associated with an application. The index number may either be displayed on a user interface to an end users, or be referenced and operated by end users via a menu, a remote control or similar accessory, a remote control program, a machine button, etc.

Presetting an index table (block S100) may include acquiring program resources and associated information, identifying applications installed in a system and associated information, and establishing a one-to-one correspondences between associated information of program resources, as well as associated information of applications, and index numbers to form an index table. For example, presetting an index table may include acquiring channel information of program resources and other associated information of the program resources from software and hardware components of systems of a conventional TV, radio TV and IP TV, managing this type of information, for example, by sorting the acquired program resources according to an amount of views, forming a file with the sorted contents for local storage, and making revisions on corresponding file contents according to user defined revisions or updates of the program resources. The method may include searching for the associated information of a program resource, corresponding to the determined index number, based on an index table, and positioning to the program channel corresponding to the program resource using the associated information (block S200). The method may further include searching for the associated information of an application, corresponding to the determined index number, based on the index table, and positioning to the application using the associated information.

A system may regularly acquire associated information of program resources and applications in the current system, compare the acquired associated information with the corresponding content in the index table, and if the acquired associated information and the corresponding content in the index table are inconsistent according to the comparison, update the associated information of program resources or applications into the index table. In such a way, the system may ensure that all contents in the associated information items of an index table are the latest information. When a new application is installed in the system, the system may acquire associated information of the application, and may automatically add the new application into the index table, and assign a corresponding index number to the new item. The method may also include, starting and displaying the identified program resource or application (block S300).

Figure 2:
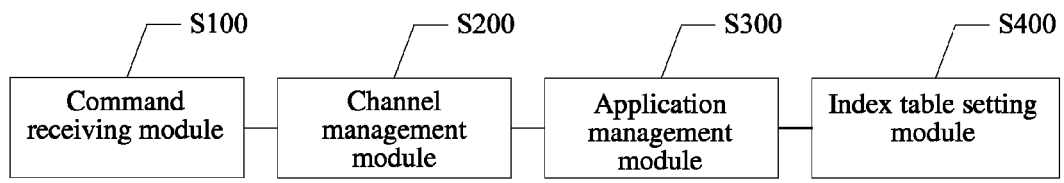
FIG. 2 depicts a principle block diagram of a system for accessing TV programs and applications on a smart TV in an exemplary embodiment of the present invention.

With reference to FIG. 2, a system for accessing TV programs and applications on a smart TV may include a command receiving module 100 for receiving a channel selection command from a user. The system may also include a channel management module 200 for determining an index number corresponding to the channel selection command received by the command receiving module, searching for a program resource or an application corresponding to the determined index number based on a preset index table, and starting and displaying the identified program resource.

The system may integrate the associated information of program channels with associated information of applications for management, may receive inquiries and requests from other components of the apparatus or software, and may confirm if the requested object is an operation associated with a conventional program channel or an application based on the records of the managed information. The system may further include an application management module 300 for starting and displaying the application identified by the channel management module. For example, the application management module may be in charge of calling of applications to be run on an apparatus and communications between the applications and components of all software or hardware in the apparatus and/or operating system. The channel management module may be a module for communicative connection. The system may further include an index table setting module 400 for presetting an index table.

Figure 3:
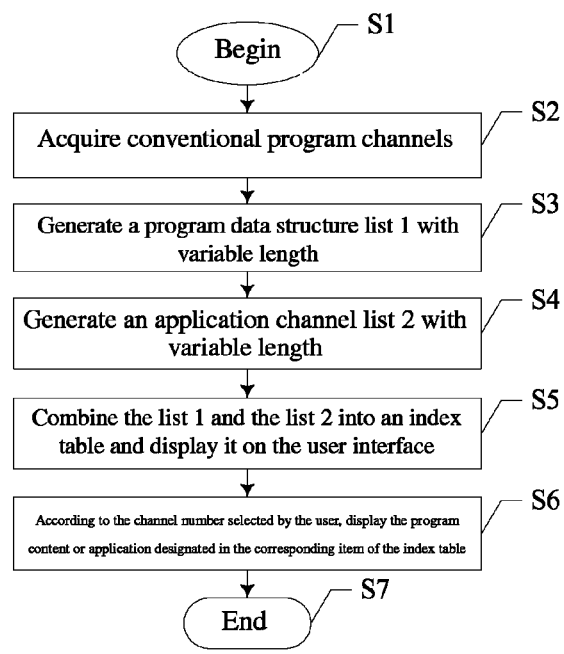
FIG. 3 depicts a flow chart of a method for creating and applying an index table according to the present invention.

Turning to FIG. 3, creating and applying an index table setting module 400 may begin (block S1). The index table setting module 400 may acquire conventional program channels (block S2). The channel management module 200 may acquire channel information of program resources and other associated information of the program resources from software and hardware components of systems of a conventional TV, a radio TV and an IP TV (i.e. acquiring associated information of the program resources).

The index table setting module 400 may generate a program data structure list 1 with variable length (block S3). The index table setting module 400 may also go through the acquired associated information of the program resources, organize the acquired associated information of the program resources into a channel identification, a channel number and channel auxiliary information, and form the program data structure list 1 with variable length using the above associated information. The term "variable length," as used herein, means that the list 1 may perform real time updating actions such as content addition and replacement.

The index table setting module 400 may generate an application channel list 2 with variable length (block S4). The channel management module 200 may acquire, from the application management module, information associated with all available applications and methods for calling the applications collected from the apparatus or system (i.e. the associated information of the applications), and may form the application channel list 2 using the above information. The index table setting module 400 may combine the list 1 and the list 2 into an index table, and display the index table on a user interface (block S5).

The channel management module 200 may maintain a list of mixed data structure items (i.e. the index table) that may mix and arrange items from the program data structure list 1 and the application channel list 2. Each item in the table may include at least one index number and one item of associated information representing either a program resource or an application. The above index number may either be displayed on a user interface to end users, or may be referenced and operated by end users via a menu, a remote control or similar accessory, a remote control program, a machine button, etc. Channel selections, by a user, can be responded to well through a correspondence between index numbers and items associated with program resources and applications.

According to the channel number selected by the user, the index table setting module 400 may display the program content or application designated in the corresponding item of the index table (block S6). When the user inputs the channel number (channel code) by means of, for example, a remote control, remote control software, etc., the channel management module 200 may identify an item corresponding to the index number bundled with the channel number in the index table by searching the index table. The item may correspondingly store the item of associated information of a specific program resource, or the item of associated information of a specific application. According to the above inquiry result, if the item is an item of the associated information of a program resource, the channel management module 200 may position to the specific program channel using the item content, and display the corresponding program content to the user. If the item is an item of the associated information of an application, the channel management module 200 may position to the application and the application calling parameter using the item, and run or call the application by the application management module according to the application and the application calling parameter recorded in the item.

The index table setting module 400 may end (block S7). A method and a system for accessing TV programs and applications on a smart TV are provided. The system may change a channel management mode of conventional systems of smart TVs and set-top boxes, such that information of TV programs and applications can be displayed together and called conveniently. Thereby, a user can conveniently and rapidly switch between programs and applications without the need to switch between TV channel and application interfaces, which may reduce operation complexity, may simplify operations, and may facilitate use of an associated smart TV by elderly people and children.

It should be understood that applications of the present invention are not limited to the above examples. To those skilled in the art, improvements or modifications may be made according to the above description, and all of these improvements or modifications shall be encompassed by the scope of the appended claims.

The invention claimed is:

1. A method for accessing TV programs and applications on a smart TV, the method comprising:
   receiving a channel selection command from a user;
   determining an index number corresponding to the channel selection command;
   searching for at least one of a program resource corresponding to the determined index number or an application corresponding to the determined index number in a single preset index table identifying correspondences between index numbers and program resources of the smart TV and applications of the smart TV, the single preset index table to be generated by:
      generating a program data structure by acquiring and sorting the program resources and information associated with the program resources based on a number of views,
      generating an application list by identifying the applications and information associated with the applications, and
      combining the program data structure and the application list to form the single preset index table, wherein information associated with an application comprises an application name enabling execution of the application and an application calling parameter comprising at least one of: a program history calling information, a program running state, a program home subscriber, a program multi-access authority or attribute, or a program limiting condition; and starting and displaying the corresponding program resource or the corresponding application using the application name and the application calling parameter.

2. The method for accessing TV programs and applications on a smart TV according to claim 1, wherein the information associated with the program resources comprises at least one of:
a channel identification,
a channel number, or
channel auxiliary information,
wherein the channel identification is label information or a key recognition technical parameter of each program channel by a system, the channel number is an identification information code designated by the system to a program channel, and the channel auxiliary information comprises a channel name, channel description information and channel content prompt information.

3. The method for accessing TV programs and applications on a smart TV according to claim 1, wherein the application name comprises at least one of:
an application calling entry point,
a type name,
a registered name of the program, or
a program file name.

4. The method for accessing TV programs and applications on a smart TV according to claim 1, wherein the information associated with the program resources and the information associated with the applications, in a current system, is acquired regularly and is compared with corresponding content in the preset index table, and if the acquired information associated with the program resources or the acquired information associated with the applications and the corresponding content in the preset index table are inconsistent according to the comparison, then the corresponding content is updated in the preset index table.

5. The method for accessing TV programs and applications on a smart TV according to claim 1, further comprising:
searching for information associated with a program resource corresponding to the determined index number based on the preset index table, and positioning to a program channel corresponding to the program resource using the information associated with the program resource; and
searching for information associated with an application corresponding to the determined index number based on the preset index table, and positioning to the application using the information associated with the application.

6. A method for accessing TV programs and applications on a smart TV, the method comprising:
determining an index number corresponding to a channel selection command from a user;
generating a single preset index table, identifying one-to-one correspondences between index numbers and program resources of the smart TV and applications of the smart TV, by:
acquiring and sorting the program resources and information associated with the program resources based on a number of views to create a program data structure,
identifying the applications and information associated with the applications to create an application list, and combining the program data structure and the application list to form the single preset index table,
wherein information associated with an application comprises an application name enabling execution of the application and an application calling parameter comprising at least one of: a program history calling information, a program running state, a program home subscriber, a program multi-access authority or attribute, and a program limiting condition;
searching the single preset index table for at least one of a program resource or an application corresponding to the determined index number; and
starting and displaying the corresponding program resource or the corresponding application using the application name and the application calling parameter.

7. The method for accessing TV programs and applications on a smart TV according to claim 6, wherein the information associated with program resources comprises at least one of:
a channel identification,
a channel number, or
channel auxiliary information, wherein the channel identification is label information or a key recognition technical parameter of each program channel by a system, the channel number is an identification information code designated by the system to a program channel, and the channel auxiliary information comprises a channel name, channel description information and channel content prompt information.

8. The method for accessing TV programs and applications on a smart TV according to claim 6, wherein the application name comprises at least one of:
an application calling entry point,
a type name,
a registered name of the program, or
a program file name.

9. The method for accessing TV programs and applications on a smart TV according to claim 6, wherein the information associated with the program resources and the information associated with the applications, in a current system, is acquired regularly and is compared with corresponding content in the preset index table, and if the acquired information associated with the program resources or the acquired information associated with the applications and the corresponding content in the preset index table are inconsistent according to the comparison, then the corresponding content is updated in the preset index table.

10. The method for accessing TV programs and applications on a smart TV according to claim 6, further comprising:
searching for the information associated a program resource corresponding to the determined index number based on the preset index table, and positioning to a program channel corresponding to the program resource using the information associated with the program resource; and
searching for information associated with an application corresponding to the determined index number based on the preset index table, and positioning to the application using the information associated with the application.

11. A system for accessing TV programs and applications on a smart TV, the system including:
a smart TV;
a remote control device;

wherein the smart TV is configured to:
receive a channel selection command from a user with the remote control device;
determine an index number corresponding to the channel selection command;
search for at least one of a program resource corresponding to the determined index number or an application corresponding to the determined Index number in a single preset index table identifying index numbers corresponding to program resources of the smart TV and applications of the smart TV, the single preset index table to be generated by:
generating a program data structure by acquiring and sorting the program resources and information associated with the program resources based on a number of views,
generating an application list by identifying the applications and information associated with the applications, and
combining the program data structure and with application list to form the single preset index table, wherein information associated with an application comprises an application name enabling execution of the application and an application calling parameter comprising at least one of: a program history calling information, a program running state, a program home subscriber, a program multi-access authority or attribute, and a program limiting condition; and
start and display the corresponding program resource or the corresponding application using the application name and the application calling parameter.

12. The system for accessing TV programs and applications on a smart TV according to claim 11, wherein the smart TV is further configured to: update the single preset index table with new program resources and information associated with the new program resources, and new applications and information associated with the new applications; and assign new index numbers to the updated single preset index table.

* * * * *